United States Patent [19]

Marien

[11] 4,071,843
[45] Jan. 31, 1978

[54] VIDEO COLOR DISPLAY SYSTEM

[75] Inventor: Jacques Marien, Paris, France

[73] Assignee: Thomson-CSF, Paris, France

[21] Appl. No.: 637,148

[22] Filed: Dec. 3, 1975

[30] Foreign Application Priority Data

Dec. 27, 1974 France .................. 74 43149

[51] Int. Cl.² .................. G01S 7/06; G01S 7/20; G01S 7/22

[52] U.S. Cl. .................. 343/5 CD; 343/5 EM; 343/5 SC

[58] Field of Search .............. 343/5 CD, 5 EM, 5 SC

[56] References Cited

U.S. PATENT DOCUMENTS

| | | | |
|---|---|---|---|
| 3,114,907 | 12/1963 | Luftman et al. | 343/5 CD X |
| 3,123,824 | 3/1964 | Sherertz | 343/5 CD X |
| 3,294,891 | 12/1966 | Antul et al. | 343/5 CD X |
| 3,587,298 | 6/1971 | Jacobs | 343/5 CD X |
| 3,617,997 | 11/1971 | Maass et al. | 343/5 CD X |
| 3,780,371 | 12/1973 | Rymes | 343/5 CD X |
| 3,836,961 | 9/1974 | Ennis et al. | 343/5 CD X |
| 3,840,773 | 10/1974 | Hart | 343/5 CD X |

Primary Examiner—Malcolm F. Hubler
Attorney, Agent, or Firm—Edwin E. Greigg

[57] ABSTRACT

A video color display system in which a synthetic image consisting of fixed and variable symbols and a radar image representing raw video are shown simultaneously and each in a plurality of shades. The video image supplied by a radar is converted into $x$ and $y$ signals so as to be displayed by a line-by-line scan, these signals being in addition selected in separate allotments as a function of predetermined parameters and distributed accordingly in a store. The scan generator circuit is multimode and produces a line-by-line scan for the radar display and a random scan for the display of synthetic symbols. The radar image is displayed in different shades to suit the selection which is made.

6 Claims, 7 Drawing Figures

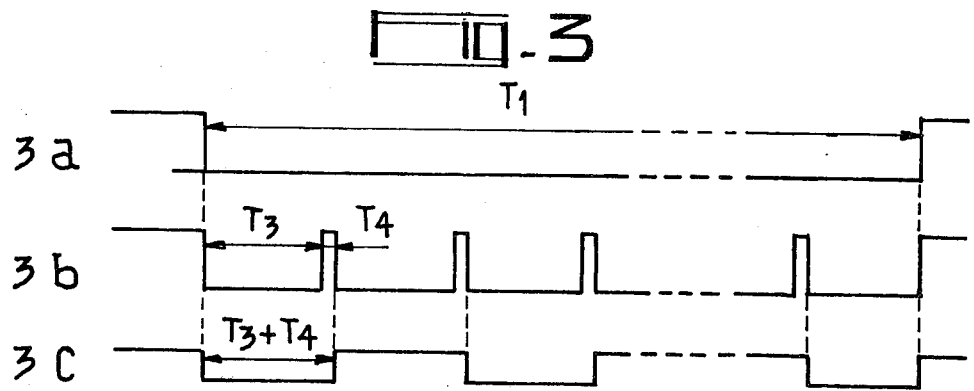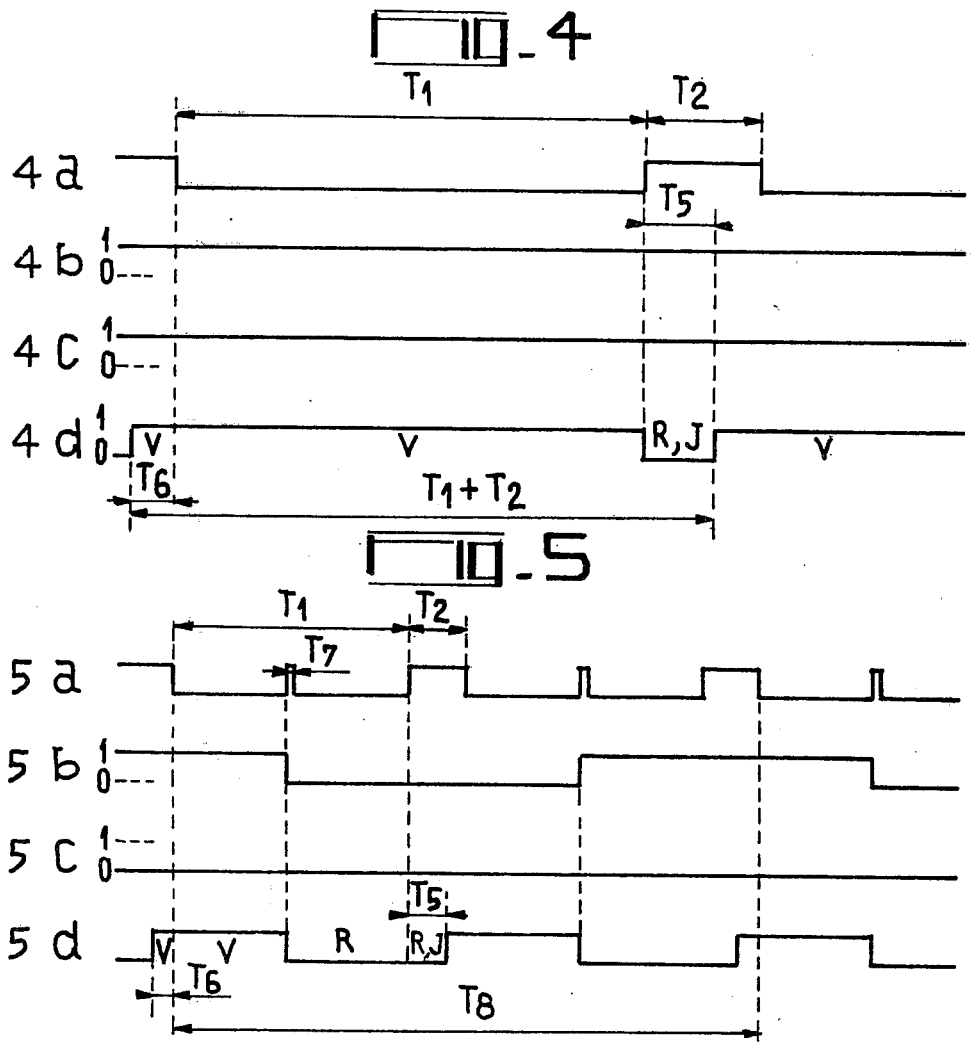

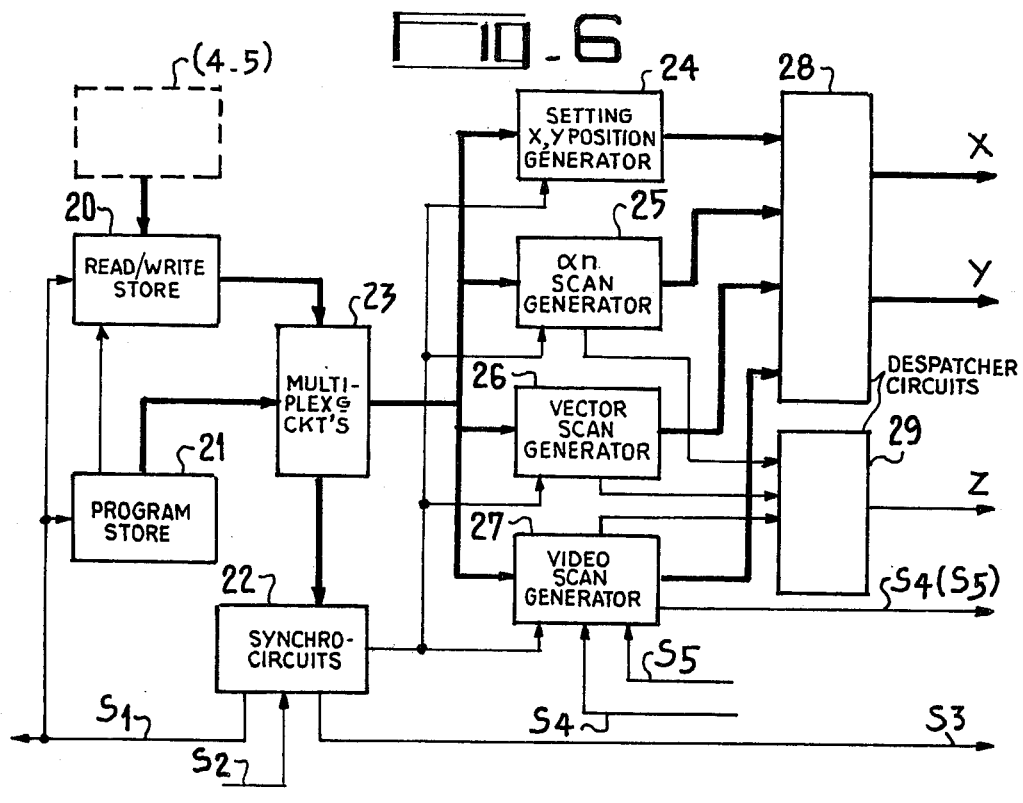
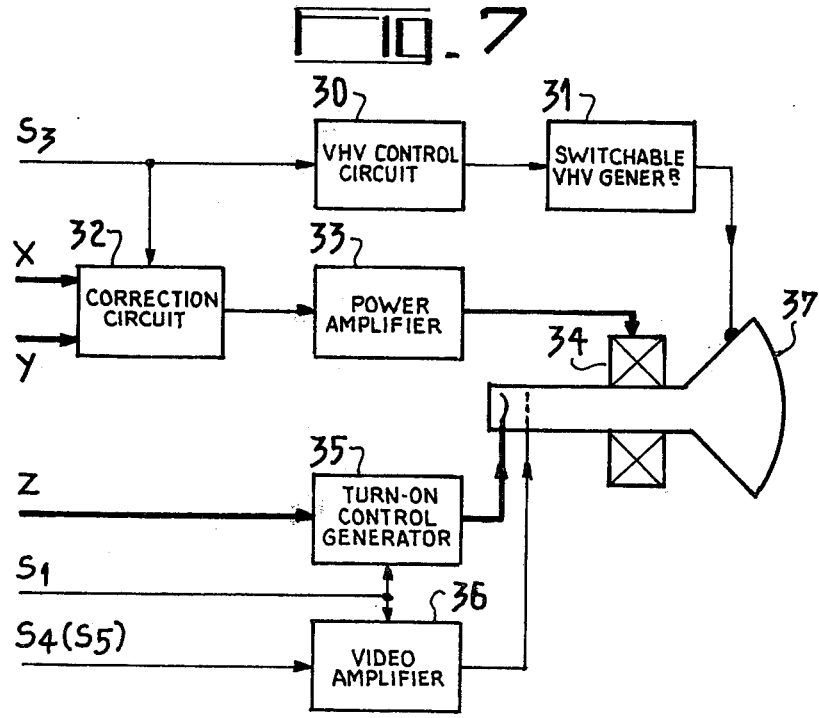

VIDEO COLOR DISPLAY SYSTEM

The present invention relates to a video color display system for displaying video images, on a color cathode-ray tube.

The invention relates more particularly to a display system which enables to display a raw video radar map in a plurality of shades of one or more colors and simultaneously a color display of a synthetic video image made up of symbols; the radar map may be replaced by a television image from a T.V. camera which is synchronised by the display system.

In the context of military applications for intruder or interceptor aircraft, the radar map may be of the air to air, air to ground, or terrain following type; in the context of civil applications it may be a meteorological chart.

The synthetic image, which may be formed by symbols such as vectors and alpha-numerical characters, is generated by the system. These symbols are intended to provide the observer, who may be the pilot of an aircraft for example, with visual information relating to navigation, to the weapons system, to countermeasures or information of any type. This information is traced out on the screen using a non-systematic scan which is usually referred to as a random scan.

As to the radar or television image, these are traced out by a line-by-line scan.

The display system is particularly intented to be part of an electronic pilot indicator system and to form an item of air-borne equipment. This being the case, it needs to be genuinely compact and of light weight and to meet stringent demands. Particularly to satisfy mechanical strength requirements, the colour cathode-ray tube used is of the penetration type. This type of tube has a single electron gun of which the acceleration voltage is varied, and a multi-layer screen to produce different colors.

The display of video images composed both of raw or synthetic radar video and of synthetic video consisting of alphanumeric symbols or of vectors takes place, inter alia, in air traffic control systems. When in raw video form, the radar image is shown in one color and generally on a remanent screen. In certain cases the radar video is processed to form a synthetic video similar to the symbol video and it can then be shown in a number of colours, as the latter.

It is also known to use in such control systems a special penetration tube termed a bi-remanent tube, of which the screen has a first remanent layer intended to display the raw video from a radar, using a panoramic scan, and a second, non-remanent layer intended for the synthetic symbol video. The radar is shown by means of a line-by-line scan of the television type on a monochrome display tube after it has been processed in an image converter apparatus such as a memory-tube device.

One object of the invention is to display a radar image in raw video using a plurality of shades distributed according to several tones in one or more colors, the distribution corresponding to selected types of information for the observer, for example, to a selection on the basis of altitude, range, the fixed or moving nature of the echoes, and so on.

Another object is to display con-jointly with the radar image a synthetic image of symbols which may be wholly or partly superimposed on the radar image or may be generated outside the area covered by the radar image.

In accordance with the invention, there is provided a video color display system for displaying on a penetration color cathode ray tube, a first image provided from raw video conjointly with a second image called synthetic image made of symbols representative of specific data, said system comprising ancillary radar means which provides said raw video representative of a radar map;

conversion means for converting the said raw video into radar video signals with a view to a line-by-line scan and comprising a processing circuit for providing the said raw video in the form of X and Y video signals for the said line-by-line scan and to make selections from these signals according to at least one predetermined selection parameter and a memory circuit for storing separately said selected video signals;

symbol generating means for providing symbol video signals with a view to a random scan and comprising vector and alphanumeric symbol generating means;

scan generating means for providing the said respective random and line-by-line scans successively; and shade selection means for providing a predetermined color display for the said synthetic image and a display for the said X and Y video signals in a plurality of separates shades in at least one color, the said shades corresponding respectively to the separate store allotments.

The invention will now be further described with reference to the accompanying drawings, in which:

FIG. 3 shows waveforms of main synchronising signals for providing a line-by-line scan as in FIG. 2;

FIG. 4 shows operation waveforms relating to a simple color radar display;

FIG. 5 shows operation waveforms relating to a dual color radar display;

FIG. 6 is a block diagram of the symbol generator and multimode scan assembly forming a part of the display system;

FIG. 7, a block diagram of the color CRT display section and associated circuits forming another part of the display system.

Figure 1:
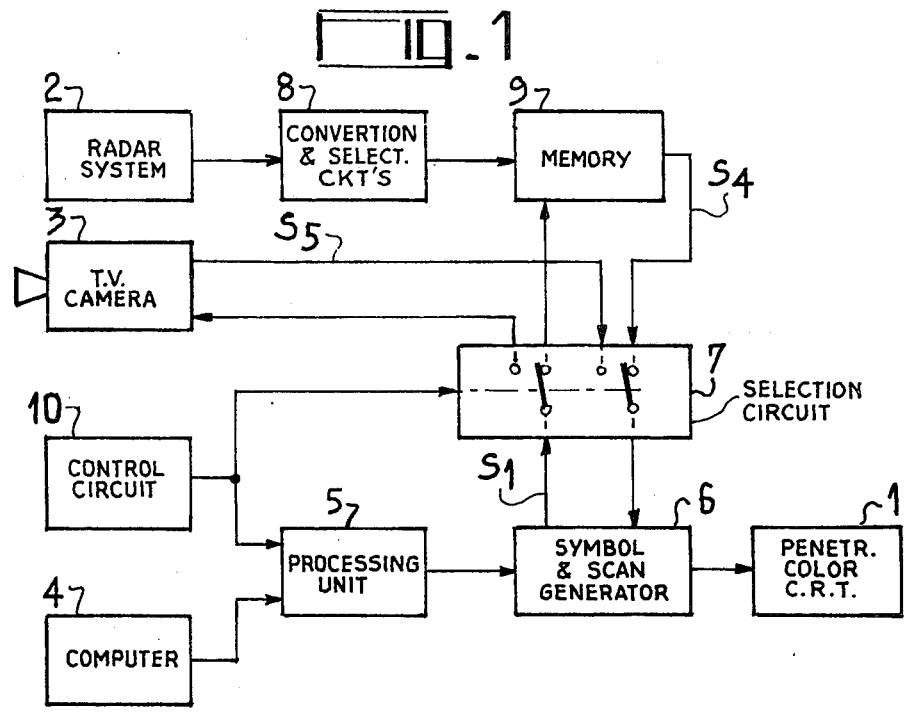
FIG. 1 is a general block diagram of a display system according to the invention.

Referring to the FIG. 1 the display system comprises a group of circuits to produce images of graphic symbols representing a synthetic map which is to be shown on the screen of a color penetration cathode ray tube 1, and circuits for generating a video image from radar or television video signals coming from an associated radar system 2 or from a television pick-up camera 3. The symbol generating assembly breaks down into main components which consist of a computer 4 and a control device 10 which are connected via an interface circuit (not shown) to a processing unit 5, the signals from which feed a circuit 6 which generates X and Y deflection signals and turn-on signals Z. Such an assembly is known, per se, and may be produced in various ways. A known apparatus for producing and recording graphical symbols etc. is described, e.g. in U.S. Pat. Nos. 3,772,677 and 3,696,391.

A selector circuit 7 allows a choice to be made between operating with radar images or with television images. It is thus possible for the video signals (S5) to come from the T.V. camera 3, which is synchronised (S1) by a local synchronisation circuit of the display system. In the case of radar video signals, and, in particular in the case of signals representing a panoramic scan, a converter-selector circuit 8 performs an analogue numeric conversion and a conversion into X and Y cartesian co-ordinate signals for the purposes of a line-by-line scan, and makes a selection from the signals concerned as a function of predetermined parameters and distributes and stores them accordingly in a memory circuit 9. The selection which is made is subsequently reflected by representation in different shades on the screen of the tube. Read-out (S4) from the memory takes place at the local synchronisation rate (S1).

Figure 2:
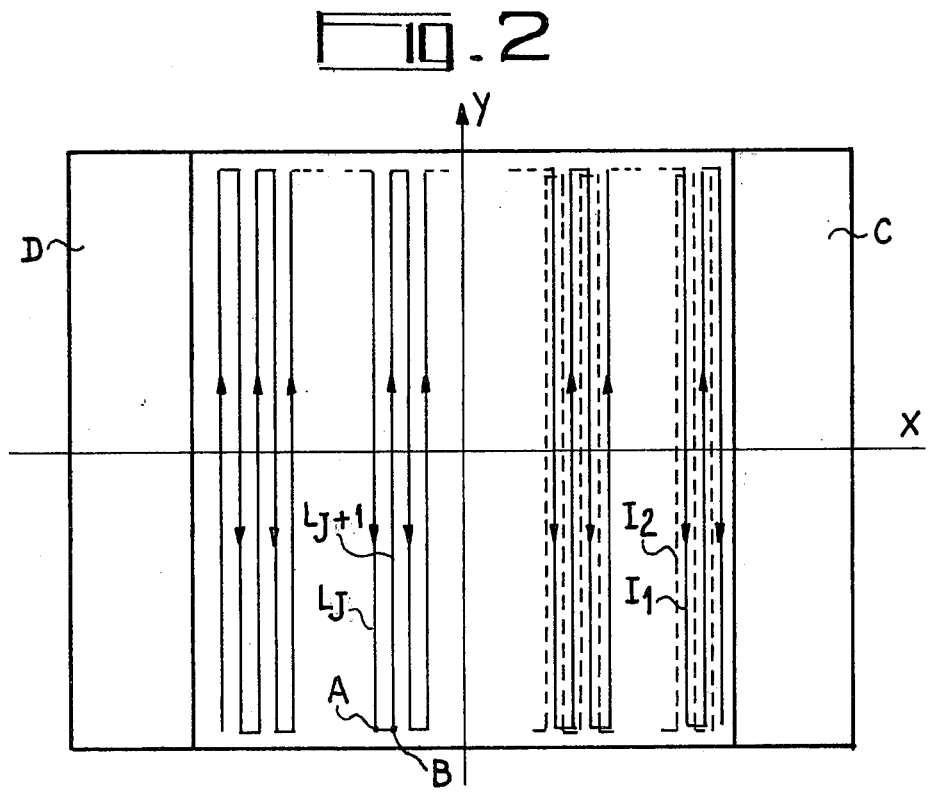
FIG. 2 shows a possible line-by-line scan for the video radar display.

The video data S4 stored in the memory may be read out at a faster rate than that at which the radar scan takes place, which makes it unnecessary to use a remanent tube; furthermore, a B or E panoramic scanning mode of the radar is converted into an X, Y scan, which makes it possible to simplify the scanning circuits of the tube and to obtain uniform definition no matter what mode is used to display the incoming signals. In addition, the video information to be stored is processed to take into account a specific parameter, such as altitude for example. It is also possible to show in a different way, those echoes which are situated above a safety level represented by a predetermined altitude. The video signals representing these echoes may be selected and stored separately in the memory so that, after read-out, they will be traced on the screen in a colour different from that used to display echoes located below this level. These latter echoes generally represent dangerous fixed echoes which are brought to the observer's attention in this way. Two chief modes of operation may be employed; a first mode in which the radar video signals are displayed in only one color, green for example, but in tones which differ depending on range for instance, and a second mode in which the radar map is displayed in two different colors, green and red for example, as a function of a selected parameter. The numerical memory may be a known digital memory and may, e.g. comprise three layers, each of 320 × 320 bits capacity, to form on the screen a map of 320 lines each of 320 dots. The three layers enables the video information for each dot concerned to be coded on three bits, one bit per layer. In cases where a monochrome radar map is shown using the first mode mentioned above, the three bits are coded in pure binary and thus enable eight different levels to be distinguished for the video signals, these corresponding to eight possible shades of a color in the case of monochrome operation. In cases where the radar map is shown in two colors, two of the three bits can be used to obtain four different signal levels and the third bit can be used to identify the color, green or red. In an application to an electronic radar indicator system, echoes situated above a certain altitude which are considered dangerous may thus be displayed in one color, such as red, using a single shade of this color, the other echoes being shown in green with four possible levels. The video signals coming from the radar are read into the numerical memory at the scanning rate and repetition frequency of the radar. This read-in takes place at the repetition frequency of the radar. However, to display the radar signals on a three color tube, it is necessary for the memory to be read at the timing frequency of the display system. Thus, when in the write mode, the numerical memory 9 is under the control of the radar synchronisation and when in the read mode is under the control (S1) of the local display synchronisation. The video signals received by the display system, whether they originate from memory 9 in the case of radar video signals, or whether they come directly from camera 3, are displayed on the screen of the tube by using the type of scan in alternating vertical lines known as a "Greek key" scan, which is illustrated in FIG. 2. With this method of scanning, the time interval between one line and the next may be very small since it is only used to make a small shift in the X direction transverse to the Y direction of the line scan from the end point A of a given line Lj to the starting point B of the next line Lj + 1.

In the case of monochrome operation, such as in air to ground (mapping) or air to air presentations, the radar video is for example shown in green with 320 lines for bearing, approximately 300 dots per line for range and eight video levels representing eight tones of green ranging between a light green and a dark green. The lines are traced out without interlacing with a frame recurrence frequency of 50 Hz and a scan time of better than 20 ms, so as to leave a certain amount of time for the display of the symbols by means of a random scan. These successive scans may have, for example, respective value of 16 ms and 4 ms.

In the case of two-color operation, certain echoes need to appear in a second color, such as echoes which are situated above a safety level and are considered dangerous, and which it is desired to display in red. Consequently, it becomes necessary to trace two frames on the screen, one in green and the other in red. In a color cathode-ray tube of the penetration type, the color of the trace is obtained by selecting the very high voltage which is used to supply the tube. The change in the very high voltage from one level to another in order to change colour cannot be performed instantaneously and it is not feasible to trace dots of different colours in the same line or in two successive lines in a frame. When the digital memory 9 is read for the first time dots of a first color such as green may be traced and then, when it is next read, dots of a second color such as red may be traced. With a frame time of 16 ms for a 320 line scan, a complete radar image made up of two frames is displayed in 40 ms, i.e. at a repetition frequency of 25 Hz. The two frames are produced by interlacing as shown in one part of FIG. 2, where a trace I1 is shown in solid lines and a trace I2 in broken lines. The trace may be made by interlacing odd and even lines and by interlacing first and second colors, in the way which is described below with reference to FIG. 5.

Lateral areas C and D (FIG. 2) of the screen may be reserved to contain all or part of the synthetic image trace. The generator circuit 6 (FIG. 1) includes means to form directly that part of the trace which involves vectors and symbols other than alphanumeric symbols, which latter are generally produced by means of a special generator.

FIG. 3 shows the signals for synchronising the Greek key line-by-line scan made by the CRT 1. The cyclic frame signal at 3a comprises a pulse whose length T1 represents the line-by-line scan duration for raw video S4 or S5, and a pulse (all of which is shown on FIG. 4a) whose length is T2 during which the random scan for synthetic video is provided. The values for T1 and T2 may be 16 and 4 ms. In the same way, the cyclic line synchronisation signal at 3b contains, during interval T1, a pulse of length T4 for the changeover to the start of the next line (AB FIG. 2). The values of T3 and T4 may be 42 and 2 μs. The signal at 3c represents the direction in which the vertical line scan is to take place, that is to say, from bottom to top for one line and from top to bottom for the next line.

FIG. 4 relates to scan synchronising signals when the radar video display is operating in monochrome. The signals are respectively the frame signal at 4a, a signal at 4b for identifying whether the line-by-line scan is with or without frame interlacing, a signal at 4c for the line-by-line scan to identify whether operation is monochrome or two colour, and a signal 4d for identifying the colors green V, or red R and yellow J. The synthetic scan is generated during time T2 by a non-systematic scan, a first period T5 being used for the red and yellow symbols and a second period T6 for the green symbols.

In a similar way, FIG. 5 shows the signals for synchronising the scan when the radar video display is operating with two colors. In this mode of operation, where there is dual interlacing between odd and even and red and green, it will be seen that the first half of period T1, i.e. 160 lines of a first frame, are used to trace out the raw video on the odd green lines, while the next 160 lines are traced on the even red lines and then, in the second frame, the trace is made up of 160 even green lines and 160 odd red lines. The interval T7 in the middle of the frame period T1 allows the change to be made from even to odd and the color to be changed. The complete image is obtained in two frame periods T8.

When operating with a television image, this is always shown in monochrome.

The functional layout of the multi-mode scan and symbol generator is shown in a simplified fashion in the diagram of FIG. 6. Memory devices are located at the input, namely a read/write store 20 and a program store 21. In the program store is stored information on symbols relating to fixed data in the form of numerical words defining vectors and alphanumeric data. The read/write store 20 receives information on variable data from outside sources.

This information reaches the computer 4 via the processing unit 5, which latter unloads the computer and makes all the special calculations required for display purposes. A circuit 22 contains a time-base which supplies signals S1 for synchronising the display system. It also contains means for decoding control signals S2 received from processing unit 5 (FIG. 1) and it generates, inter alia, the color signal S3 (4d and 5d in FIGS. 4 and 5). In accordance with a predetermined program which is timed by the program store 21, fixed or variable data are transmitted successively, via a multiplexing circuit 23, to a setting signal generator circuit 24 for setting the X and Y position of the trace, and to one or other of scan generator circuits 25 and 26 depending upon whether it is an alphanumeric data or a vector which is involved. A fourth generator circuit 27 receives video signals S4 or S5 depending upon the position of the selector circuit 7 (FIG. 1). Generator circuits 24 to 27 are synchronised by time-base circuit 22 and supply on the one hand, via first despatcher 28, the X and Y deflexion signals and, via a second despatcher 29, a turn-on signal Z. The raw video S4 or S5 is shown transmitted through the generator circuit 27 where it may be amplified.

In FIG. 7 is shown the additional section marked 1 in FIG. 1 which embraces the CRT and its associated circuits. This section may, inter alia, be remotely connected to the generator assembly (FIG. 6) in cases where the application is to an electronic pilot indicator. The color signal S3 brings about a change-over in the very high voltage by acting on the VHV control circuit 30 which in turn triggers switchable VHV circuit 31. Such a circuit is described in detail e.g. in U.S. Pat. No. 3,914,617 incorporated by reference. The X and Y signals are applied, via a circuit 32 in which in particular corrections are made for linearity, to a power amplifier circuit 33 which supplies the appropriate deflection signals for X and Y positioning to the deflection members 34 of the tube. The turn-on signal Z is transmitted, via a turn-on control generator circuit 35, to the cathode of the tube and the raw video signal S4 or S5 is applied, after suitable amplification at 36, to a grid electrode of a penetration color tube 37.

The radar section of FIG. 1, which involves the processing at 8 of the radar video signals which are received in analogue form from the radar 2, with a view to their storage at 9, may be produced in various ways as dictated in particular by the selection parameters used for display. The analoq/digital conversion of these signals is assumed to take place using known techniques, as also is the conversion of co-ordinates when this is required to obtain X and Y cartesian co-ordinate signals intented for the line-by-line scan made on the screen of the penetration tube 1. The form taken by the circuits for selecting the signals with a view to storing them in different ways is a function of the selection parameters used in the intended application. There are in existence radar systems which are fitted with circuits for selecting signals in such a way that only certain of the received signals are displayed and it is assumed in this case also that these circuits may be produced using known techniques.

It is understood that the system described may be modified in known ways which still fall within the invention. By way of example, memory 9 may be differently arranged or contain a number K of layers greater than three so as to provide $2^k$ separate graduations to be alloted to one or more colors on the screen.

Of course the invention is not limited to the embodiment described and shown which was given solely by way of example.

What is claimed is:

1. A video color display system for displaying on a color cathode-ray tube, a first image provided from raw video conjointly with a second image called synthetic image made of symbols representative of specific data, said system comprising ancillary radar means for providing said raw video representative of a radar map and processing means for converting the said raw video into X and Y radar video numerical signals with a view to a line-by-line scan and for selecting these signals as a function of predetermined selection parameters;

display means comprising said color cathode-ray tube which is of the penetration type, and a very high voltage supply of the switchable type for supplying a very high voltage to said tube;

memory means for storing separately said selected video signals and comprising $k$ layers each having a capacity of $n_1 \times n_2$ bits to produce a radar image constituting said first image having $n_1$ lines with $n_2$ dots per line in the course of a frame scan and to code the said radar signals on $k$ bits for each dot, the said processing means providing at most $2^k$ separate allotments as a function of the said selection parameters;

vector and alphanumeric symbol generating means for providing symbol video signals with a view to a random scan;

scan generating means for providing the said respective random and line-by-line scans successively; and shade selection means comprising control means for controlling said very high voltage supply for providing a predetermined color display for the said synthetic image and for displaying the said X and Y video signals in a plurality of separate shades in at least one color, the said shades corresponding respectively to separate store allotments in said memory.

2. A video color display system according to claim 1, wherein the said radar image is made in $2^k$ shades of one colour corresponding to the said $2^k$ allotments.

3. A video color display system according to claim 1, wherein the said radar image is in two colors using $2^{k-p}$ shades of a first color corresponding to $2^{k-p}$ allotments and $2^p$ shades of a second color corresponding to $2^p$ allotments, the said scan means producing a Greek key line-by-line scan with the lines interlaced from one frame to the next, the radar image being displayed as a complete image formed by two successive frames.

4. A video color display system according to claim 3, wherein the radar image is in two colors using $2^{k-1}$ shades of a first color corresponding to $2^{k-1}$ allotments produced by $k-1$ layers and using one shade of a second color produced from a single layer.

5. A video color display system according to claim 3, wherein it comprises selector means connected by inputs to the memory circuit and to a television camera and at the output to the scan generator to replace the said X and Y video signals by those for a television image supplied by the said camera, this latter being synchronised line-by-line by the said scan generator.

6. A video color display system according to claim 5, wherein the synthetic image is displayed in three colours and at least partly in areas of the screen which are lateral to those in which the radar image is displayed.

* * * * *